US008347606B2

(12) United States Patent
Sakimoto et al.

(10) Patent No.: US 8,347,606 B2
(45) Date of Patent: Jan. 8, 2013

(54) EXHAUST GAS AFTER TREATMENT SYSTEM AND METHOD FOR OPERATING AN EXHAUST GAS AFTER TREATMENT SYSTEM FOR INTERNAL COMBUSTION ENGINE

(75) Inventors: Masatsugu Sakimoto, Frankfurt (DE); Hiroshi Yamada, Hiroshima (JP); Hiroaki Ishida, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 1204 days.

(21) Appl. No.: 12/175,301

(22) Filed: Jul. 17, 2008

(65) Prior Publication Data

US 2009/0025368 A1 Jan. 29, 2009

(30) Foreign Application Priority Data

Jul. 23, 2007 (JP) ................................ 2007-190449

(51) Int. Cl.
*F01N 3/00* (2006.01)
(52) U.S. Cl. ................. 60/286; 60/285; 60/295; 60/324
(58) Field of Classification Search .................... 60/285, 60/286, 295, 324
See application file for complete search history.

(56) References Cited

U.S. PATENT DOCUMENTS

| 5,976,475 A * | 11/1999 | Peter-Hoblyn et al. ....... 423/212 |
| 6,192,676 B1 * | 2/2001 | Zurbig et al. .................. 60/286 |
| 6,203,770 B1 * | 3/2001 | Peter-Hoblyn et al. ....... 423/212 |
| 6,892,529 B2 * | 5/2005 | Duvinage et al. .............. 60/286 |
| 7,065,958 B2 * | 6/2006 | Funk et al. ...................... 60/286 |
| 7,100,365 B2 * | 9/2006 | Nishizawa et al. ............. 60/285 |
| 7,886,529 B2 * | 2/2011 | Gonze et al. .................... 60/295 |
| 2002/0112472 A1 * | 8/2002 | Tashiro et al. .................. 60/295 |
| 2005/0229590 A1 | 10/2005 | Bruck et al. |
| 2006/0191254 A1 | 8/2006 | Bui et al. |
| 2006/0236677 A1 * | 10/2006 | Inagaki et al. .................. 60/276 |

FOREIGN PATENT DOCUMENTS

| DE | 4203807 | 8/1993 |
| JP | 2003-232218 | 8/2003 |
| WO | 2007/125230 | 11/2007 |

OTHER PUBLICATIONS

European Patent Office, International Search Report of EP08013101, Sep. 30, 2008, 1 page.

* cited by examiner

*Primary Examiner* — Thomas Denion
*Assistant Examiner* — Anthony Ayala Delgado
(74) *Attorney, Agent, or Firm* — Alleman Hall McCoy Russell & Tuttle LLP

(57) ABSTRACT

A system for controlling performance of an internal combustion engine. The system may include an internal combustion engine having an exhaust system for processing gases exhausted from the internal combustion engine. The exhaust system may be comprised of at least one mixing device, at least one emission control device, and a delivery apparatus for delivering an agent affecting operation of the emission control device into the exhaust system. The at least one mixing device may be located downstream of the internal combustion engine and upstream of the at least one emission control device, and the delivery apparatus may be located upstream of the emission control device. The system may include a controller to adjust at least one engine parameter in relation to an operating condition of the mixing device.

12 Claims, 6 Drawing Sheets

1: Engine
2: Air-intake Passage
3: Exhaust Passage
4: EGR Passage
5: EGR Valve
10: Exhaust-gas Treatment System
11: Oxidation Catalyst
12: DPF
13: Urea Injection Nozzle
14: Urea Aqueous Solution Tank
15: Mixing Plate
16: SCR Catalyst
17: Ammonia Oxidation Catalyst
21: First Differential-pressure Sensor
22: Second Differential-pressure Sensor
23: Exhaust Gas Temperature Sensor
24: Ammonia Sensor

EXHAUST GAS AFTER TREATMENT SYSTEM AND METHOD FOR OPERATING AN EXHAUST GAS AFTER TREATMENT SYSTEM FOR INTERNAL COMBUSTION ENGINE

TECHNICAL FIELD

The present description relates to an exhaust-gas treatment system and a method for operating an exhaust-gas treatment system for an internal combustion engine. More particularly, the description pertains to an exhaust-gas treatment system and a method for operating the exhaust-gas treatment system in order to decrease nitrogen oxide (NOx) that may be contained in emissions from an internal combustion engine.

BACKGROUND AND SUMMARY

Urea-SCR (Selective Catalytic Reduction) systems are a known technology for decreasing NOx contained in the emissions from an internal combustion engine. Often, a selective reduction catalyst is placed in an engine exhaust passage to reduce NOx in the exhaust gases. A urea aqueous solution injection nozzle is placed upstream of the selective reduction catalyst for injecting urea (or urea reductants) into the exhaust stream. The injected urea is thermally decomposed or hydrolyzed into ammonia by heat from exhaust gas. Then, the ammonia is adsorbed into the selective reduction catalyst where it is used to reduce NOx to produce nitrogen (N2) and water (H2O). Thus, a denitrating reaction reduces NOx in exhaust gas.

In this regard, if the injected aqueous urea is not dispersed in the exhaust passage sufficiently, the ammonia generated from the urea will be adsorbed into the selective reduction catalyst disproportionately. As a result, the urea may produce more ammonia than desired in certain SCR regions while conversion of NOx may be reduced in other SCR regions.

One system for addressing this issue is described in JP2003-232218. In this reference, a mixing element for facilitating mixing of a urea aqueous solution injected from an injection nozzle with exhaust gas is provided in an exhaust passage located between the urea injection nozzle and a selective reduction catalyst. This mixing element comprises a division plate on which an opening is formed having a smaller cross-sectional area than a cross-sectional area of the plate. When exhaust gases contact the division plate and pass through the opening, the exhaust flow is disturbed. This causes the injected aqueous urea solution to mix well within the exhaust gases and to be more uniformly distributed to the SCR.

However, the inventors herein have discovered that some chemical compound crystals may attach to a surface of the mixing element. These crystals are thought to be derived from the injected urea. Specifically, thermal decomposition of urea is thought to form crystals of cyanuric acid made up of three isocyanic acid molecules. If such crystals continue to be deposited on the mixing element, the opening of the division plate becomes narrower, as it is blocked by the crystals and thereby increases exhaust gas-flow resistance. This can decrease engine torque performance and cause a decrease in engine output.

This detailed description addresses exhaust gas flow restriction in the presence of urea injection. In particular, the detailed description provides for an improved exhaust-gas treatment system that uses a urea-SCR.

One aspect of the present description includes a system for controlling performance of an internal combustion engine, the system comprising: an internal combustion engine having an exhaust system for processing gases exhausted from the internal combustion engine; the exhaust system comprised of at least one mixing device, at least one emission control device, and a delivery apparatus for delivering an agent affecting operation of the emission control device into the exhaust system, the at least one mixing device located downstream of the internal combustion engine and upstream of the at least one emission control device, and the delivery apparatus located upstream of the emission control device; and a controller to adjust at least one engine parameter in relation to an operating condition of the mixing device.

This system overcomes at least some of the disadvantages of the above reference.

By increasing the engine exhaust gas temperatures, gas-flow resistance in the exhaust passage related to the injected urea can be reduced. Consequently, engine torque and emissions can be substantially retained even if deposits occasionally form within an exhaust system. In one embodiment, a mixing element is placed in the exhaust system to improve mixing of the aqueous urea and the exhaust gases. Deposits attaching to the mixing device can be reduced by increasing engine exhaust gas temperatures. As a result, formation of deposits around the mixing device is reduced and the available engine torque is substantially maintained.

In a second aspect of the present description, a particulate trap is provided upstream of an exhaust gas mixing device and a selective reduction catalyst. Urea is introduced to the exhaust system upstream of the mixing device. A controller operates to raise engine exhaust gas temperatures when an exhaust gas flow is being restricted by either the particulate filter or the mixing device. This system also overcomes at least some of the disadvantages of the above reference.

In a third aspect of the present description, a method is provided for controlling operating conditions of an exhaust gas after treatment system that is coupled to an internal combustion engine, and includes an emission control device and a delivery apparatus for delivering an agent affecting operation of the emission control device into the exhaust gas after treatment system, the method comprising: purposefully increasing the exhaust gas temperature of the internal combustion engine when the pressure difference across an exhaust gas mixing device located within the exhaust gas after treatment system exceeds an amount. It will be appreciated that the purposeful increase may be achieved by programmatically controlling the internal combustion engine to increase the exhaust gas temperature.

The present description provides several advantages. Specifically, the system and method help to maintain engine torque if urea deposits form in an exhaust system. Further, the system and method promote mixing of aqueous urea and exhaust gases by reducing flow restrictions that may be caused by urea deposits. Further still, the method allows for particulate filter regeneration and urea deposit reduction at different times and frequencies. Consequently, less fuel may be necessary to operate the engine.

The above advantages and other advantages and features of the present description will be readily apparent from the following Detailed Description when taken alone or in connection with the accompanying drawings.

DETAILED DESCRIPTION

Figure 1:
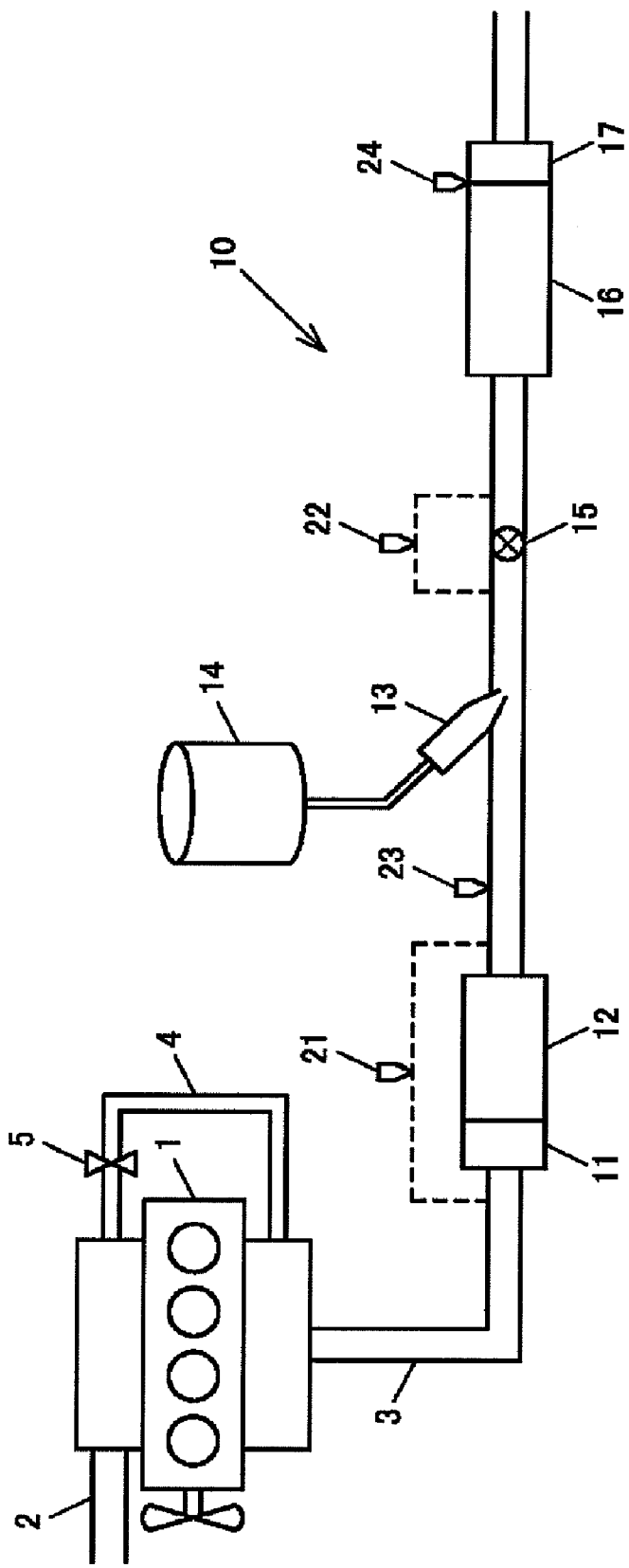
FIG. 1 is a schematic view showing an entire exhaust-gas treatment system for an engine according to an embodiment of the invention.

FIG. 1 is a schematic view showing an entire exhaust-gas treatment system 10 of an internal combustion engine 1 according to an embodiment of the present invention. In this embodiment, the engine 1 is a diesel engine, and includes an air-intake passage 2, an exhaust passage 3, an EGR passage 4 that allows a portion of the exhaust gas to return to an air-intake side, and an EGR valve 5 provided in the EGR passage 4.

In the exhaust passage 3, from an upstream side, an oxidation catalyst 11 for oxidizing to burn unburnt fuel contained in the exhaust gas, a diesel particulate filter element (DPF) 12 for collecting particulates contained in the exhaust gas, a urea injection nozzle 13 for injecting urea aqueous solution supplied from in a urea aqueous solution tank 14 into the exhaust passage 3, a mixing plate 15 for stimulating mixing of the urea aqueous solution injected from the injection nozzle 13 with the exhaust gas, a selective reduction (SCR) catalyst 16 for selectively reducing NOx contained in the exhaust gas, and an ammonia oxidation catalyst 17 for preventing an excess portion of ammonia generated from the urea aqueous solution injected from the nozzle 13 from releasing to the atmosphere, are disposed in this order.

Further in the exhaust passage 3, a first differential-pressure sensor 21 for detecting a differential pressure between immediately upstream and immediately downstream of the DPF 12, a second differential-pressure sensor 22 for detecting a differential pressure between immediately upstream and immediately downstream of the mixing plate 15, an exhaust gas temperature sensor 23 disposed immediately upstream of the urea injection nozzle 13 to detect a temperature of the exhaust gas flowing into the mixing plate 15, and an ammonia sensor 24 for detecting an ammonia concentration immediately downstream of the SCR catalyst 16, are provided.

Here, if a first differential pressure detected by the first differential-pressure sensor 21 is greater than a predetermined value, it is considered that an amount of the particulates accumulated on the DPF 12 is greater than a predetermined value. In this case, it is necessary to regenerate the DPF 12 by burning to remove the particulates accumulated on the DPF 12.

On the other hand, if a second differential pressure detected by the second differential-pressure sensor 22 is greater than a predetermined value, it is considered that an amount of compound crystals adhered to the mixing plate 15 (derived from urea, which will be described later) is greater than a predetermined value. In this case, it is necessary to melt and remove the compound crystals adhered to the mixing plate 15 (for convenience, this is referred to as "cleaning" of the mixing plate 15), and thereby, reduce an increase in an exhaust resistance due to the mixing plate 15 disposed in the exhaust passage 3.

Particularly, in this embodiment, the exhaust-gas treatment system 10 is a urea SCR system for reducing nitrogen oxide contained in the exhaust gas from the engine 1. The purifying reaction mechanism thereof is approximately as follows.

As shown in the following reaction formula (Chemical Formula 1), the urea in the urea aqueous solution injected from the urea injection nozzle 13 develops a thermal decomposition reaction by heat of the exhaust gases to generate ammonia and isocyanic acid. This thermal decomposition reaction starts at approximately 135 degrees C. or higher, and mainly occurs in a section from the urea injection nozzle 13 to the SCR catalyst 16.

$$CO(NH_2)_2 \rightarrow NH_3 + HNCO \qquad \text{[Chemical Formula 1]}$$

As shown in the following reaction formulas (Chemical Formulas 2 and 3), the urea in the urea aqueous solution injected from the urea injection nozzle 13 and the isocyanic acid generated by the thermal decomposition reaction develop a hydrolysis reaction to generate ammonia and carbon dioxide, respectively. This hydrolysis reaction starts at approximately 160 degrees C. or higher, and mainly occurs in a section from the urea injection nozzle 13 to the SCR catalyst 16.

$$CO(NH_2)_2 + H_2O \rightarrow 2NH_3 + CO_2 \qquad \text{[Chemical Formula 2]}$$

$$HNCO + H_2O \rightarrow NH_3 + CO_2 \qquad \text{[Chemical Formula 3]}$$

In addition, as shown in the following reaction formula (Chemical Formula 4), the ammonia generated from the urea develops a denitration reaction with NO and $NO_2$ to reduce the nitrogen oxide to nitrogen and water. This reductive reaction starts at approximately 200 degrees C. or higher, and mainly occurs inside the SCR catalyst 16.

$$4NO + 2NO_2 + 4NH_3 \rightarrow 5N_2 + 6H_2O + O_2 \qquad \text{[Chemical Formula 4]}$$

In addition, as shown in the following reaction formula (Chemical Formula 5), the ammonia generated from urea develops a denitration reaction with $NO_2$ in the presence of oxygen to convert the nitrogen oxide to nitrogen and water. This oxidative reduction reaction starts at approximately 200 degrees C. or higher, and mainly occurs inside the SCR catalyst 16.

$$2NO_2 + O_2 + 4NH_3 \rightarrow 3N_2 + 6H_2O \qquad \text{[Chemical Formula 5]}$$

By summarizing the Chemical Formulas 4 and 5, the following reaction formula (Chemical Formula 6) can be obtained. According to this summarized formula, it can be seen that the reaction rate is largest and most efficient when the ratio of NO concentration and $NO_2$ concentration in the exhaust gases is 1:1.

$$NO + NO_2 + 2NH_3 \rightarrow 2N_2 + 3H_2O \qquad \text{[Chemical Formula 6]}$$

As shown in the following reaction formula (Chemical Formula 7), the excess ammonia that was not involved in the reductive reaction is decomposed into nitrogen and water in the presence of oxygen. This oxidation reaction occurs within the ammonia oxidation catalyst 17.

$$4NH_3 + 3O_2 \rightarrow 2N_2 + 6H_2O \qquad \text{[Chemical Formula 7]}$$

Figure 2A:
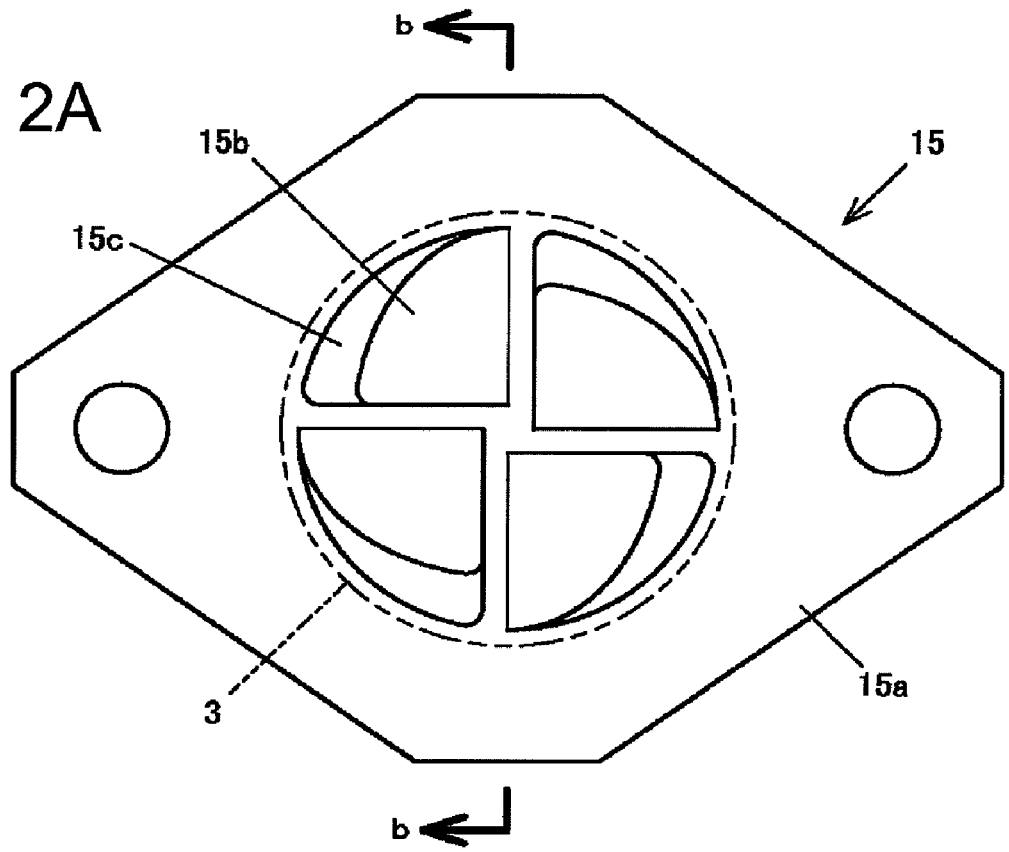
FIG. 2A is an elevation view of a mixing plate as a mixing device equipped on the exhaust-gas treatment system, shown in FIG. 1.
Figure 2B:
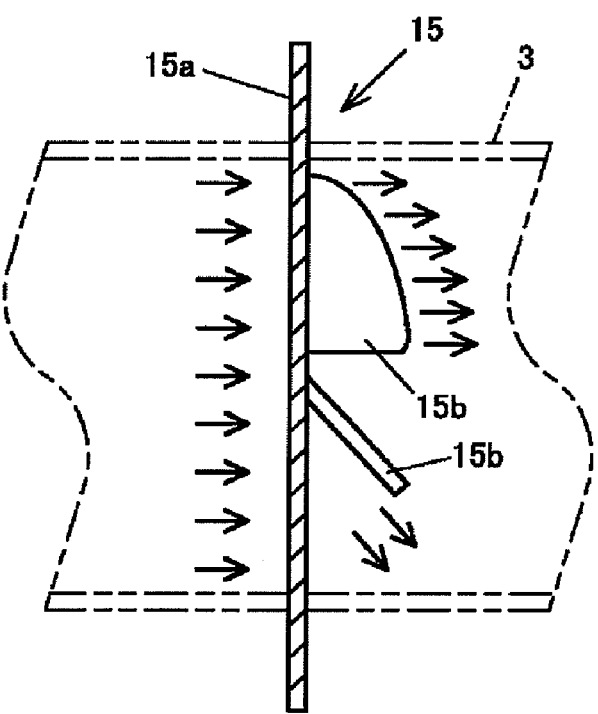
FIG. 2B is a cross-sectional view taken at b-b of FIG. 2A.

FIGS. 2A and 2B show one example of the mixing plate 15 that can be suitably applied to this embodiment. As illustrated, the mixing plate 15 has a division plate portion 15a mounted inside the exhaust passage 3 so as to cross the exhaust passage 3. In this example, the division plate portion 15a is partially cut and bent downwardly to form four sections 15b having shapes that define sectors in the division plate portion 15a. As a result, the division plate portion 15a is formed with four openings 15c, each of which has a cross-sectional area smaller than a cross-sectional area of the exhaust passage 3.

Accordingly, as shown by arrows in FIG. 2B, the exhaust gas flowing from upstream of the exhaust passage 3 collides with the mixing plate 15, and then passes through the openings 15c to create a turbulent flow in the exhaust gas. As a result, the urea aqueous solution injected in the exhaust gas at the upstream and the exhaust gas are agitated to sufficiently distribute the urea aqueous solution in the exhaust gas.

As described above, the mixing plate 15 can sufficiently distribute the urea aqueous solution throughout the exhaust passage 3. At the same time, because the cross-sectional areas of the openings 15c and the bent angles of the bent sections 15b are relatively small, the turbulence of the exhaust gas increases. That is, the mixing plate 15 functions as a resistance to the exhaust gas flow inside the exhaust passage 3, to increase the exhaust gas pressure. It may degrade torque performance of the engine 1 and, as a result, degrade output performance of the engine 1.

In addition, according to the present inventors' perceptions, it is known that the compound crystals that are considered to be derived from urea in the urea aqueous solution injected from the urea injection nozzle 13 adhere to the mixing plate 15. If the adhesion of such crystals continues, the openings 15c formed in the mixing plate 15 are blocked and become narrower, and thereby further increase the exhaust resistance created by the mixing plate 15. Therefore, the output performance of the engine drops. Such a condition of the mixing plate 15 can be determined by the second differential-pressure sensor 22 sensing the second differential pressure being greater than a predetermined value.

Here, it can be considered that the compound crystals adhered to the mixing plate 15 are crystals of cyanuric acid that is formed by a collection of three molecules of isocyanic acid (refer to Chemical Formula 1), generated from the urea in the urea aqueous solution injected from the urea injection nozzle 13 that initially develops a thermally decomposition reaction. The melting point of the crystals of cyanuric acid is approximately 360 degrees C. If the engine runs at less than half the rated engine speed, or half the rated engine load, and if the condition continues, the temperature of the exhaust gas may not reach 360 degrees C. As a result, the crystals do not melt, and they adhere to the mixing plate 15 to be accumulated.

Figure 3:
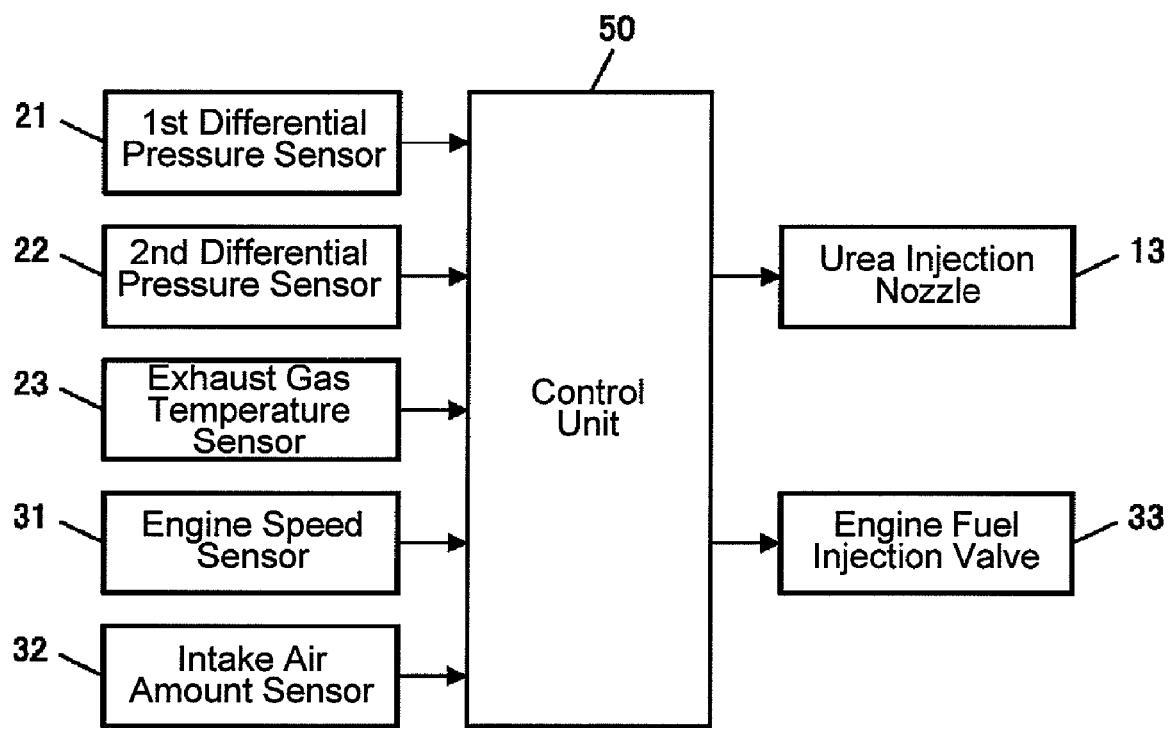
FIG. 3 is a control block diagram of the exhaust-gas treatment system shown in FIG. 1.

As shown in FIG. 3, a control unit 50 of the exhaust-gas treatment system 10 is inputted with a signal from the first differential-pressure sensor 21, a signal from the second differential-pressure sensor 22, a signal from the exhaust gas temperature sensor 23, a signal from an engine speed sensor 31 that detects an engine speed of the engine 1, and a signal from an intake-air amount sensor 32 that detects an intake-air amount passing through the air-intake passage 2. The control unit 50 outputs control signals based on the input signals to the urea injection nozzle 13 and a fuel injection valve 33 of the engine 1.

Figure 4:
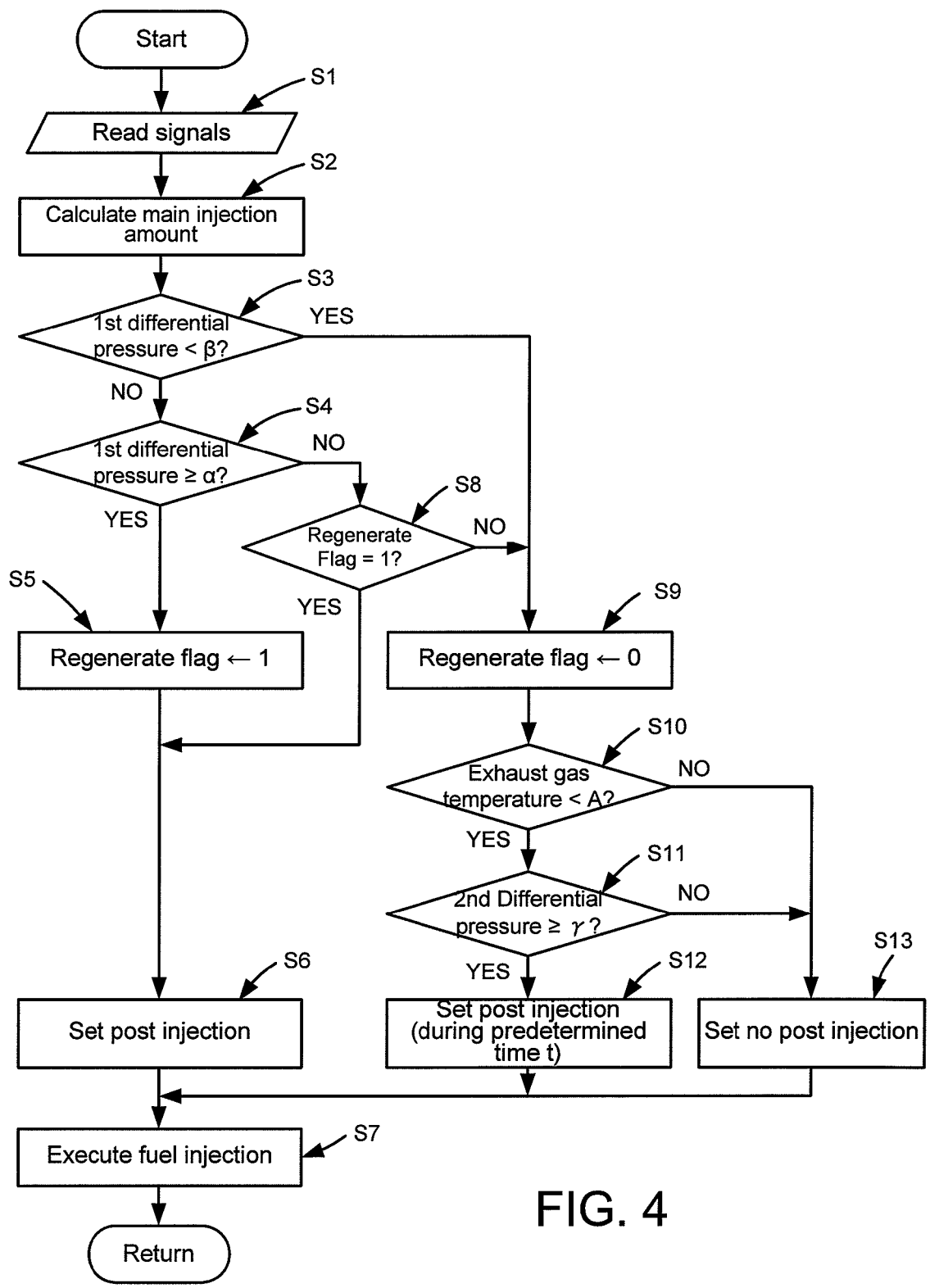
FIG. 4 is a flowchart showing an example control performed by a control unit shown in FIG. 3.

FIG. 4 is a flowchart showing one example of the control operation to be performed by the control unit 50.

First, at Step S1, the control unit 50 reads the input signals, and then, at Step S2, it calculates a fuel injection amount of main injection (i.e., a fuel injection performed in proximity to the top dead center of a compression stroke of the engine 1) based on a gas-pedal opening, an engine speed or an intake-air amount, for example.

Figure 5:
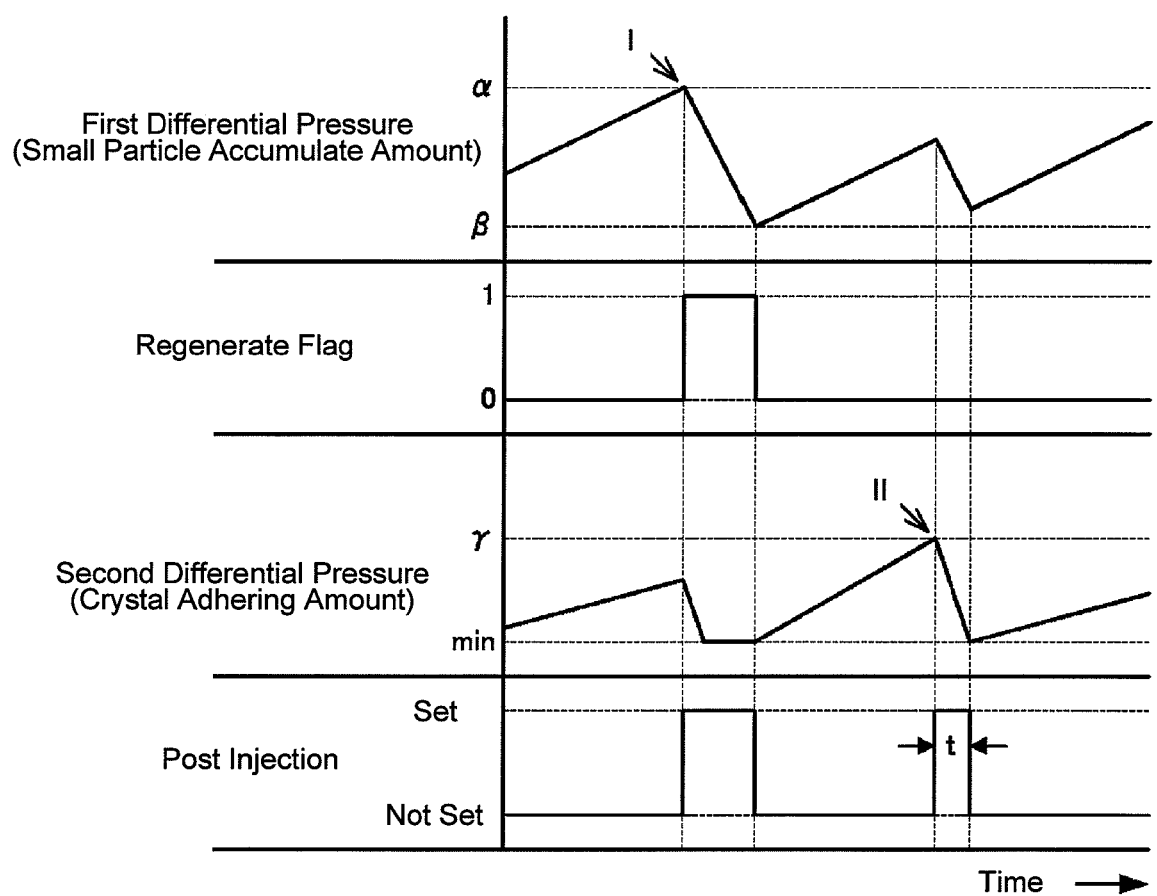
FIG. 5 is a timing chart showing the control of FIG. 4.

Next, at Step S3, the control unit 50 determines whether the first differential pressure detected by the first differential-pressure sensor 21 is below a predetermined value β. Here, as shown in FIG. 5, the predetermined value β is set to a very small value in proximity to zero. That is, the control unit 50 checks that particulates have not substantially accumulated on the DPF 12.

Then, if the first differential pressure detected by the first differential-pressure sensor 21 is greater than the predetermined value β (NO at Step 3), the control unit 50 then determines whether the first differential pressure detected by the first differential-pressure sensor 21 is greater than the predetermined value α at Step S4. Here, as shown in FIG. 5, the predetermined value α is set to a larger value than the predetermined value β (i.e., α>β). That is, the control unit 50 is configured to determine whether particulates are accumulated on the DPF 12 for a predetermined amount, and whether it is necessary to regenerate the DPF 12.

If YES at Step S4, that is, if it is necessary to perform the regeneration of the DPF 12, the control unit 50 then sets a regeneration flag to "1" at Step S5. Then, at Step S6, the control unit 50 sets a post injection (or an after injection). That is, the control unit 50 is configured to set the fuel injection amount by the post injection to a value that is not zero (for example, a value set in advance). In other words, for example, during the exhaust stroke after the main fuel injection of the engine 1, the control unit 50 causes a predetermined amount of fuel to be injected. Then, the control unit 50 causes the injected fuel to be burned to oxidize in the oxidation catalyst 11 upstream of the DPF 12. Therefore, a temperature of the exhaust gas increases to regenerate the DPF 12 by burning and removing the particulates accumulated on the DPF 12.

Then, at Step S7, the control unit 50 performs a fuel injection (main injection and post injection) and then returns to Step S1.

On the other hand, if NO at Step S4, the control unit 50 then determines whether the regeneration flag is "1" at Step S8. If YES, that is, if the regeneration of the DPF 12 is under execution, the control unit 50 then proceeds to Step S6. On the other hand, if NO at Step 8, that is, if the regeneration of the DPF 12 is not under execution, the control unit 50 then proceeds to Step S9. The control unit 50 may also proceed to Step S9 if YES at Step S3.

At Step S9, the control unit 50 resets the regeneration flag to "0." Then, at Step S10, the control unit 50 determines whether the exhaust gas temperature detected by the exhaust gas temperature sensor 23 (particularly, the temperature of the exhaust gas flowing into the mixing plate 15) is below a predetermined temperature "A." Here, the predetermined temperature "A" is set to a melting temperature of the crystals adhered to the mixing plate 15 (e.g., if the crystals are cyanuric acid, the temperature is the melting point of the cyanuric acid, which is 360 degrees C.).

If YES at Step 10, that is, if it is necessary to increase the exhaust gas temperature to melt and remove the crystals adhered to the mixing plate 15, the control unit 50 then determines whether the second differential pressure detected by the second differential-pressure sensor 22 is greater than a predetermined value γ at Step S11. Here, as shown in FIG. 5, the predetermined value γ is set to a larger value than the minimum predetermined value "min" (i.e., γ>min). In other words, the control unit 50 determines whether a considerable amount of the compound crystals generated from urea are adhered to the mixing plate 15, and it is necessary to perform cleaning of the mixing plate 15.

If YES at Step 11, that is, if it is necessary to perform cleaning of the mixing plate 15, the control unit 50 then sets a predetermined time "t" as the post injection and its duration time at Step S12. Here, as shown in FIG. 5, the predetermined time "t" is set to a sufficient value to melt and remove the crystals adhered to the mixing plate 15. In other words, for example, at the exhaust stroke of the engine 1 after the main fuel injection, the fuel is post injected, and the post-injected fuel is then burned to be oxidized in the oxidation catalyst 11 upstream of the mixing plate 15. Therefore, the temperature of the exhaust gas increases to perform the cleaning of the mixing plate 15 by melting and removing the crystals adhered to the mixing plate 15.

Then, the control unit 50 performs a fuel injection (main injection and post injection) at Step S7, and then returns to Step S1.

On the other hand, if NO at Step S10, that is, if the temperature of the exhaust gas flowing into the mixing plate 15 is higher than the melting temperature "A" of the crystals adhered to the mixing plate 15, and if it is not necessary to increase the exhaust gas temperature to melt and remove the crystals adhered to the mixing plate 15, the control unit 50 then sets it to "No Post Injection" at Step S13 (i.e., an amount of the post injection is set to zero). If the post injection has already been executed, the post injection is stopped even if the predetermined time "t" is lapsed.

Then, the control unit 50 performs the fuel injection at Step S7, and then returns to Step S1. In this case, the fuel injection includes only the main fuel injection amount calculated at Step S2.

Also if NO at Step S11, that is, the cleaning of the mixing plate 15 is not necessary, the control unit 50 then sets it to "No Post Injection" at Step S13 (i.e., an amount of the post injection is set to zero, however, the post injection is continued during the execution of the post injection control until the predetermined time "t" has elapsed).

Then, the control unit 50 performs the fuel injection at Step S7, and then returns to Step S1. In this case, the fuel injection includes only the main injection, an injection amount of which is calculated at Step S2 (however, main injection and post-injection during the execution of the post injection and before the predetermined time "t" has elapsed).

As a result of the above control, as shown in FIG. 5, the first differential pressure representing the accumulated amount of the particulates on the DPF 12 and the second differential pressure representing the adhered amount of the crystals in the mixing plate 15 repeatedly increase and decrease in amount over time.

For example, as shown by "I," when the first differential pressure increases to the predetermined value α (YES at Step S4), the control unit 50 then sets the regeneration flag to "1" (Step S5), and then, the post injection is performed (Step S6 to S7) to start the regeneration of the DPF 12. At this time, the first differential pressure decreases, and the temperature-increased exhaust gas flows into the mixing plate 15 (because the oxidation catalyst 11 is located upstream of both the DPF 12 and the mixing plate 15, referring to FIG. 1). Therefore, the crystals adhered to the mixing plate 15 are melted and removed to decrease the second differential pressure at the same time. The regeneration of the DPF 12 is terminated when the first differential pressure decreases to the predetermined value β.

On the other hand, as shown by "II," when the second differential pressure increases to the predetermined value γ (YES at Step S11), the control unit 50 then performs the post injection (Step S12 to S7) to start the cleaning of the mixing plate 15. At this time, the second differential pressure decreases, and the temperature-increased exhaust gas flows into the DPF 12 (because the oxidation catalyst 11 is located upstream of both the DPF 12 and the mixing plate 15, refer to FIG. 1). Therefore, the particulates adhered to the DPF 12 are burned and removed to decrease the first differential pressure at the same time. The cleaning of the mixing plate 15 is terminated when the predetermined time "t" is lapsed.

As described above, the exhaust-gas treatment system 10 for the engine 1 of this embodiment is configured as a urea SCR system in which the mixing plate 15 for stimulating the mixing of the urea aqueous solution injected from the urea injection nozzle 13 with the exhaust gas is disposed in the exhaust passage 3 between the urea injection nozzle 13 and the SCR catalyst 16. In addition, because the second differential-pressure sensor 22 that detects the differential pressure between immediately upstream and immediately downstream of the mixing plate 15 is provided, when the second differential pressure detected by the second differential-pressure sensor 22 is greater than the predetermined value γ (YES at Step S11), it can be determined that the amount of the compound crystals adhered to the mixing plate 15 is greater than the predetermined value. In such a case, because the post injection is performed to increase the temperature of the exhaust gas (Steps S12 and S7), the compound crystals adhered to the mixing plate 15 are melted and removed. Therefore, the blocked openings of the mixing plate 15 again become wider to reduce the increase in the exhaust resistance of the exhaust passage 3, and thereby, solve the problem of degradation in the torque performance and the output performance of the engine 1.

In this case, if the amount of the particulates accumulated on the DPF 12 disposed in the exhaust passage 3 upstream of the urea injection nozzle 13 is greater than the predetermined value (YES at Step S4), the control unit 50 then performs the post injection to increase the temperature of the exhaust gas (Steps S6 and S7). Further, if the regenerating of the DPF 12 that burns and removes the particulates accumulated on the DPF 12 is set to be performed, a similar post injection is performed (Steps S12 and S7). Therefore, because the temperature increase of the exhaust gas is performed to melt and remove the compound crystals adhered to the mixing plate 15, onboard components of the vehicle can be shared or combined to prevent complication of the components.

Further, in that case, as also clear from FIG. 5, if the second differential pressure detected by the second differential-pressure sensor 22 is greater than the predetermined value γ (YES at Step S11), even if the amount of the particulates accumulated on the DPF 12 is less than a predetermined value (NO at Step S4 and NO at Step S8), the temperature increase of the exhaust gas is performed (Steps S12 and S7). Burning and removing of the particulates accumulated on the DPF 12 (that is, regeneration of the DPF 12), as well as melting and removing of the crystals adhered to the mixing plate 15 (that is, cleaning of the mixing plate 15) can be performed without mutual interference.

Further, if the temperature of the exhaust gas does not reach the melting temperature "A" of the compound crystals generated from the urea (YES at Step S10), the temperature of the exhaust gas is increased (Steps S12 and S7). In other words, if the temperature of the exhaust gas reaches the melting temperature "A" of the compound crystals generated from urea (NO at Step S10), the temperature of the exhaust gas is not increased (Steps S13 and S7). Thus, the temperature increase of unused exhaust gas can be avoided to reduce the problems of the heat deterioration of the exhaust system or degradation of the fuel consumption due to the post injection.

Although the embodiments described herein illustrate the best mode of the present invention, the embodiments may be modified or changed as long as such changes or modifications do not deviate from the scope of the present invention, which may be defined by the appended claims. For example, the embodiment described above may have the oxidation catalyst 11 located upstream of the DPF 12 and upstream of the mixing plate 15 in the exhaust passage 3. When regenerating the DPF 12 and cleaning the mixing plate 15, fuel is post-injected in the engine 1. The post-injected fuel is then oxidized and burned in the oxidation catalyst 11 to increase the temperature of the exhaust gas. Therefore, it is advantageously unnecessary to add dedicated components to burn and remove the particulates accumulated on the DPF 12, and to melt and remove the crystals adhered to the mixing plate 15. However, for example, dedicated components, such as a heater, a burner, etc., may also be added to increase the temperature of the exhaust gas, as needed.

In the above embodiment, the cleaning of the mixing plate 15 is described as being performed only for the predetermined time "t" (Step S12). Alternatively, the cleaning of the mixing plate 15 may be performed until the second differential pressure increased to the predetermined value γ decreases to the minimum predetermined value "min."

In this case, the temperature increase of the exhaust gas at the time of regeneration of the DPF 12, the temperature increase of the exhaust gas at the time of cleaning of the mixing plate 15, the regeneration time of the DPF 12 (the predetermined values α and β), and the cleaning time of the mixing plate 15 (the predetermined values γ and "min" or the predetermined time "t") may be suitably changed according to conditions which may be expected.

Further, in the above embodiment, by directly detecting the temperature of the exhaust gas flowing into the mixing plate 15 using the exhaust gas temperature sensor 23, it may be determined whether the exhaust gas temperature reaches the melting temperature "A" of the crystals adhered to the mixing plate 15 (Step S10). Alternatively, it may be possible to determine whether the exhaust gas temperature reaches the melting temperature "A" of the crystals based on the engine speed, the engine load, or an operating range of the engine. For example, as described above, it may be possible to determine that the exhaust gas temperature does not reach approximately 360 degrees C. or higher, which is the melting point of the crystals of cyanuric acid in the operating range of half the rated engine speed or half the rated load.

In this case, a switch valve between a bypass passage that bypasses the mixing plate 15 and the exhaust passage 3 may be provided. Even when the second differential pressure is higher than the predetermined value γ, the exhaust gas temperature may not be increased due to traveling conditions of the vehicle, and it may be difficult to melt and remove the crystals adhered to the mixing plate 15. In such a case, it is preferable to lead the exhaust gas to the bypass passage without allowing the exhaust gas to pass through the mixing plate 15. Thereby, traveling performance of the vehicle is preserved. In this case, it is preferable to report abnormalities to a driver by an indicator in a meter panel, etc., at the same time, to urge the driver to drive the vehicle to a repair shop.

Further, in the above embodiment, the mixing plate 15 for stimulating the mixing the urea aqueous solution injected from the urea injection nozzle 13 with the exhaust gas is disposed in the exhaust passage 3 between the urea injection nozzle 13 and the SCR catalyst 16. Alternatively, the mixing plate may be provided upstream of the urea injection nozzle, and the urea aqueous solution may be introduced into a turbulent flow of the exhaust gas generated by the mixing plate to distribute the urea aqueous solution in the exhaust gas. In this case, a frequency where the crystals resulting from the urea aqueous solution adhere to the mixing plate can be lowered compared with the embodiment in which the mixing plate is provided downstream of a position where the urea aqueous solution is introduced. However, the crystals resulting from the urea aqueous solution may remain in the exhaust pipe after the engine is stopped to adhere to the mixing plate.

In the above embodiment, the engine 1 is a diesel engine. Alternatively, a gasoline engine may be adopted. If the gasoline engine is adopted, the temperature of the exhaust gas passing through a mixing device or a particulate filter element/trap may be increased by adjusting an ignition timing (e.g., retard).

Figure 6:
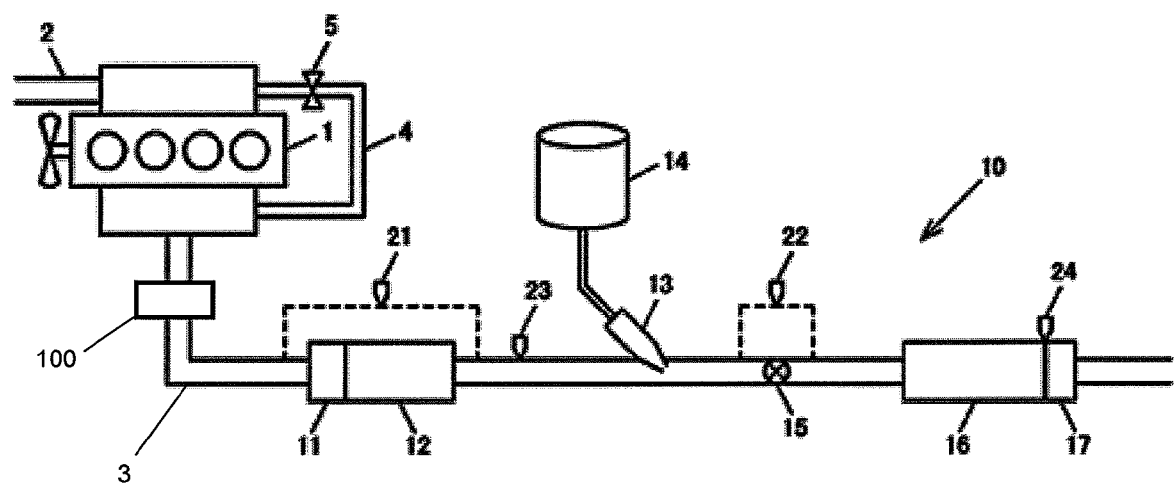
FIG. 6 is a schematic view showing an entire exhaust-gas treatment system for the engine according to another embodiment of the invention with a turbocharger provided in an exhaust system.

Further, for the exhaust system of the engine of the above embodiment, a turbocharger may be provided according to requirements of engine performance, etc. In this case, as shown in FIG. 6, a turbine of a turbocharger 100 may be provided in the exhaust passage upstream of the oxidation catalyst 11 at a position in proximity to the engine. Arranging the turbine in proximity to the engine leads to a high turbine efficiency because the temperature and the pressure of the exhaust gases are high.

Further, the mixing plate provided to fully distribute the urea aqueous solution in the exhaust gas is not limited to the configuration and shape as shown in FIGS. 2A and 2B. The mixing plate may be of any other configuration and shape (e.g., a movable fin or mesh) as long as it can achieve the above-mentioned functions.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A system for controlling performance of an internal combustion engine, the system comprising:
    an internal combustion engine having an exhaust system for processing gases exhausted from said internal combustion engine;
    said exhaust system comprised of at least a first emission control device and a second emission control device, and at least one mixing device located between said first emission control device and said second emission control device;
    a delivery apparatus for introducing agent affecting operation of said second emission control device into said exhaust system;
    a controller configured to adjust at least one engine parameter in relation to an operating condition of said mixing device, said controller also being configured to adjust at least one engine parameter in relation to an operating condition of said first emission control device;
    a first pressure sensing device for determining a pressure difference across said mixing device as said operating condition of said mixing device, said pressure difference affected by adhesion of said agent to said mixing device; and
    a second pressure sensing device for determining a pressure difference across said first emission control device as said operating condition of said first emission control device, wherein said controller is configured to adjust at least one engine parameter in relation to the pressure difference across said mixing device or the pressure difference across said first emission control device.

2. The system of claim 1 wherein said first emission control device is a particulate trap, said second emission control device is a selective reduction catalyst and said agent is urea.

3. The system of claim 1 further comprising at least a pressure sensing device for determining the differential pressure across said at least one mixing device as said operating condition of said mixing device.

4. The system of claim 1 wherein said controller is configured to adjust a fuel injection timing as said at least one engine parameter to increase a temperature of said first emission control device when the pressure difference across said first emission control device exceeds a first predetermined amount and adjust a fuel injection timing as said at least one engine parameter to increase a temperature of said mixing device when the pressure difference across said mixing device exceeds a second predetermined amount.

5. The system of claim 3 wherein said controller is configured to adjust said engine parameter when engine condition is at low load or idling drive.

6. The system of claim 1 wherein said mixing device is located downstream of a location where said agent is introduced into said exhaust system.

7. A method for controlling operating conditions of an exhaust gas after treatment system coupled to an internal combustion engine and including an emission control device and a delivery apparatus for delivering an agent affecting operation of said emission control device into said exhaust gas after treatment system, wherein said exhaust gas after treatment system further comprises a particulate trap upstream of an exhaust gas mixing device, the method comprising:

purposefully increasing an exhaust gas temperature of said internal combustion engine when a pressure difference across the exhaust gas mixing device located within said exhaust gas after treatment system exceeds an amount, wherein said pressure difference is affected by adhesion of said agent to said exhaust gas mixing device, wherein said exhaust gas mixing device is located in said exhaust gas after treatment system upstream of a selective reduction catalyst; and purposefully increasing the exhaust gas temperature of said internal combustion engine when the pressure difference across the exhaust gas mixing device exceeds a first amount and purposefully increasing the exhaust gas temperature of said internal combustion engine when a pressure difference across said particulate trap exceeds a second amount.

8. The method of claim 7 wherein said emission control device is a selective reduction catalyst and said agent is urea.

9. The method of claim 7 wherein said exhaust gas temperature is purposefully increased by adjusting fuel injection timing.

10. The method of claim 8 further comprising increasing said exhaust gas temperature in response to an operating condition of said particulate trap.

11. The method of claim 10 wherein said exhaust gas temperature is purposefully increased when the pressure difference across said particulate trap exceeds an amount.

12. The method of claim 7 wherein said exhaust gas temperature is purposefully increased when engine condition is at low load or idling drive.

* * * * *